US007862884B2

(12) United States Patent
Iwasa et al.

(10) Patent No.: US 7,862,884 B2
(45) Date of Patent: Jan. 4, 2011

(54) ELECTROPHOTOGRAPHIC FILM AND RECORDED MATERIAL USING THE SAME

(75) Inventors: Yasuo Iwasa, Ibaraki (JP); Masaaki Yamanaka, Ibaraki (JP)

(73) Assignee: Yupo Corporation, Tokyo (JP)

( * ) Notice: Subject to any disclaimer, the term of this patent is extended or adjusted under 35 U.S.C. 154(b) by 263 days.

(21) Appl. No.: 11/166,253

(22) Filed: Jun. 27, 2005

(65) Prior Publication Data

US 2006/0014004 A1 Jan. 19, 2006

Related U.S. Application Data

(63) Continuation of application No. PCT/JP03/17047, filed on Dec. 26, 2003.

(30) Foreign Application Priority Data

Dec. 27, 2002 (JP) ........................... P2002-379194

(51) Int. Cl.
*B32B 5/16* (2006.01)

(52) U.S. Cl. .................... 428/206; 428/195.1; 428/212; 428/213; 428/220; 428/325; 428/327; 428/343; 428/352; 428/500

(58) Field of Classification Search .............. 428/195.1, 428/206, 212, 213, 220, 325, 327, 343, 352, 428/500
See application file for complete search history.

(56) References Cited

U.S. PATENT DOCUMENTS 4,522,955 A * 6/1985 Fukushima et al. ......... 521/143

FOREIGN PATENT DOCUMENTS

| | | | |
|---|---|---|---|
| EP | 1 264 705 A1 | | 12/2002 |
| EP | 1 486 528 A1 | | 12/2004 |
| JP | 2000-094617 | | 4/2000 |
| JP | 2000-098647 | * | 4/2000 |
| JP | 2000-235275 | | 8/2000 |
| JP | 2002-062678 | | 2/2002 |
| JP | 2002-080619 | | 3/2002 |
| JP | 2000-98647 | | 5/2002 |
| JP | 2002-149067 | | 5/2002 |
| JP | 2002-371254 | | 12/2002 |
| WO | WO 99/28791 | * | 6/1999 |
| WO | 03/078509 A1 | | 9/2003 |

OTHER PUBLICATIONS

International Search Report.

* cited by examiner

*Primary Examiner*—Betelhem Shewareged
(74) *Attorney, Agent, or Firm*—Oblon, Spivak, McClelland, Maier & Neustadt, L.L.P.

(57) ABSTRACT

An electrophotographic film with excellent water resistance, which is more reduced in heat curling than before when used as a recording paper for thermal fixing-type electrophotographic printers or a copying machines and prevents stains of the toner-fixing unit if it jams in the printer or copying machine and which can provide continuous printing of a large number of sheets, is provided by an electrophotographic film comprising a resin film (A) formed of a resin composition containing an inorganic fine powder and/or an organic filler, the resin composition having a melt tension of 5 g or more at 210° C., a crystallization temperature of 120° C. or more and a crystallization heat of 60 J/cm$^3$ or less.

17 Claims, No Drawings

ELECTROPHOTOGRAPHIC FILM AND RECORDED MATERIAL USING THE SAME

CROSS-REFERENCE TO RELATED APPLICATIONS

The present application is a continuation of PCT/JP2003/17047 filed Dec. 26, 2003.

TECHNICAL FIELD

The present invention relates to an electrophotographic film usable for thermal fixing-type electrophotographic printers or thermal fixing-type electrophotographic a copying machines. The electrophotographic film of the present invention is excellent in the water resistance as compared with natural paper and is useful as the substrate of a poster paper for outdoor advertisements, label paper for industrial products (label indicating instructions for use or precautions), a sticker for outdoor advertisements, a label stuck on frozen food containers, wrapping paper, a book cover, a billboard or the like.

BACKGROUND ART

Coated papers have been conventionally used as a namer for industrial products, frozen food container labels or poster paper for outdoor advertisements. However, these coated paper have poor water resistance. Therefore, a resin film having good water resistance, particularly polyolefin-based synthetic paper, is being used.

Such a resin film is known and the details thereof are described, for example, in JP-B-46-40794 (the term "JP-B" as used herein means an "examined Japanese patent publication"), JP-B-49-1782, JP-A-56-118437 (the term "JP-A" as used herein means an "unexamined published Japanese patent application"), JP-A-57-12642 and JP-A-57-56224.

However, such a polyolefin-based synthetic paper is difficult to use because when being printed with a thermal fixing-type electrophotographic printer or a copying machine which fixes toner with heat energy (such as normal electrophotographic a copying machine (PPC) and laser beam printer (LBP)), the resin film undergoes a dimensional change when the toner is thermally fixed and curls up towards the printed surface side. This curling of the paper causes problems with paper discharge or failure to continuously print a large number of sheets. Furthermore, when the paper fails to properly discharge hereinafter referred to as "jamming") in the toner-fixing unit part of the printer, the film becomes partially melt-bonded to the toner-fixing unit. The toner-fixing unit then requires cleaning.

DISCLOSURE OF THE INVENTION

An object of the present invention is to solve these problems in prior techniques. More specifically, an object of the present invention is to provide an electrophotographic film with excellent water resistance, which undergoes less heat curling compared to prior films when used as a recording paper for thermal fixing-type electrophotographic printers or a copying machines. The electrophotographic film ensures an excellent paper discharge property thereby preventing jamming and staining of the toner-fixing unit, which also permits continuous printing of a large number of sheets.

As a result of intensive investigations to solve those problems, the present inventors have found that when a resin film (A) comprising a resin composition having a melt tension of 5 g or more at 210° C., a crystallization temperature of 120° C. or more and a crystallization heat of 60 J/cm$^3$ or less is selected, this film is suitable as an electrophotographic film which has a reduced curl height after printing by a thermal fixing-type electrophotographic printer or a copying machine. Further, this film prevents staining of the toner-fixing unit even if a paper jam occurs during the continuous printing of a large number of sheets which is a desirable printing property. The present invention has been accomplished based on this finding.

That is, the present invention provides an electrophotographic film comprising a resin film (A) formed of a resin composition containing an inorganic fine powder and/or an organic filler, the resin composition having a melt tension of 5 g or more at 210° C., a crystallization temperature of 120° C. or more and a crystallization heat of 60 J/cm$^3$ or less.

The electrophotographic film of the present invention is suitable for printing with a thermal fixing-type electrophotographic printer or a copying machine. The average curl height of the film at four corners of an A-4 size (210 mm×297 mm) paper, printed with a thermal fixing type electrophotographic printer or a copying machine, is preferably 50 mm or less after at least two minutes post-printing. The electrostatic capacity of the film is at least 5 pF/Cm$^2$·a copying machine In a preferred embodiment of the present invention, the resin composition used contains from 30 to 99 wt % of a thermoplastic resin and from 70 to 1 wt % of an inorganic fine powder and/or an organic filler. The thermoplastic resin is a crystalline resin, an amorphous resin, an elastomer or a combination of two or more thereof, preferably a mixture of a crystalline resin and an amorphous resin, or a mixture of a crystalline resin and an elastomer.

The crystalline resin is preferably an olefin-based resin, more preferably a propylene-based resin, still more preferably a propylene-based resin having a melt tension of 10 g or more.

The amorphous resin is preferably an amorphous resin selected from a terpene resin, a vinyl carboxylate-based resin, an acrylic acid ester, a methacrylic acid ester and a petroleum resin, and the elastomer is preferably an elastomer selected from a styrene-based thermoplastic elastomer, an olefin-based thermoplastic elastomer, a urethane-based thermoplastic elastomer and an ester-based thermoplastic elastomer.

The resin film (A) preferably has a multilayer structure, which is stretched at least in one axial direction, and has a porosity of 1 to 75% and an average heat shrinkage percentage of 10% or less of machine and cross two directions.

The resin film (A) can be laminated with another thermoplastic resin film. Also, the resin film (A) is preferably provided with an oxidation treatment layer and/or a toner-receiving layer (B). Furthermore, the resin film (A) can be used as a label paper where a release paper (D) is laminated with a adhesive layer (C).

The present invention includes a recorded material resulting from printing on the electrophotographic film with a thermal fixing-type electrophotographic printer or a a copying machine. The present invention also includes a printing method on the electrophotographic film with a thermal fixing-type electrophotographic printer or a copying machine.

BEST MODE FOR CARRYING OUT THE INVENTION

The electrophotographic film and label paper of the present invention are described below in the order of a resin film (A), a toner-receiving layer (B), a adhesive layer (C) and a release paper (D).

(1) Resin Film (A)

The resin film (A) for use in the present invention comprises a resin composition where the melt tension at 210° C. is 5 g or more, preferably 6 g or more, more preferably from 7 to 100 g, and the crystallization temperature of the main peak as measured by DSC is 120° C. or more, preferably 123° C. or more, more preferably from 125 to 300° C. If the melt tension is less than 5 g and the crystallization temperature is less than 120° C., when jamming occurs, the film stains the toner-fixing unit when it is removed (the film is partially melt-bonded to the toner-fixing unit). If printing is restarted at this point, the printing apparatus may break down or the desired textor image may not be obtained. Therefore, this staining must be removed, that is, time must be spent for the cleaning.

The crystallization heat is 60 J/cm$^3$ or less, preferably 55 J/cm$^3$ or less, more preferably from 0 to 50 J/cm$^3$. If the crystallization heat exceeds 60 J/cm$^3$, the film is greatly curled after passing through a thermal fixing-type electrophotographic printer or a copying machine causing curves or rolls making it difficult to continuously print a large number of sheets.

The average curl height enabling continuous printing of a large number of sheets is, in the case of an A-4 size (210 mm×297 mm) paper, 50 mm or less, preferably 40 mm or less, more preferably 35 mm or less, in terms of the average curl height at four corners after the passage of 2 minutes or more from printing. If the average curl height exceeds 50 mm or more, the paper sheets discharged after printing do not stack well giving rise to problems with discharging paper from the printer.

The melt tension means a tension when a melted resin is extruded from a specified die at a specified temperature and a specified extrusion rate by using a specified apparatus and then withdrawn into a filamentous state at a specified withdrawing rate. In the present invention, the melt tension is defined as a value when a resin is extruded from a capillary with a diameter of 2 mm and a length of 20 mm at 210° C. and 10 mm/min by using Capillograph Model 1C (trade name, manufactured by Toyo Seiki Seisaku-Sho, Ltd.) and then withdrawn at a withdrawing rate of 6 m/min.

The crystallization temperature is a temperature measured according to JIS-K-7121 and in the present invention, the main peak value as measured by DSC at a cooling rate of 20° C./min is defined as the crystallization temperature.

The crystallization heat is a heat measured according to JIS-K-7122 and in the present invention, the crystallization heat is defined as a value determined from the product of the measured value (heat of transition per g) by the DSC measurement at a cooling rate of 20° C./min and the raw material density.

The raw material density is a density measured according to JIS-K-7112 and in the present invention, the raw material density is defined as a film density when the resin film (A) or electrophotographic film is re-melted on a heater plate and after removing pores, cooled.

An example of an apparatus for measuring the crystallization temperature and crystallization heat is a differential scanning calorimeter (DSC6200, trade name, manufactured by Seiko Instruments Inc.).

The resin film (A) of the present invention preferably has a porous structure containing fine pores in the inside and this is advantageous from the standpoint of decreasing the film weight. The porosity is from 1 to 75%, preferably from 2 to 70%, more preferably from 5 to 65%. When the porosity is from 1 to 75%, the film can have a material strength of good level. The presence of pores in the inside can be confirmed by observing the cross section through an electron microscope.

Incidentally, the porosity as used in the present invention is a porosity represented by the formula below or a porosity determined from the area ratio (%) of pores occupying in the region when the cross section is observed by an electron microphotograph. The porosity represented by formula (1) and the area ratio are the same.

The area ratio of pores can also be determined as follows. Specifically, a porous resin film is embedded in an epoxy resin and solidified. A cut surface is produced using a microtome, and this cut surface is metallized and then subjected to image analysis observation through a scanning electron microscope set at a suitable magnification for easy observation (for example, at an enlarging magnification of 500 to 2,000, or by photographing the electron microscopy image). The cut surface can, for example, be parallel to the film thickness direction and perpendicular to the plane direction. In determining the area ratio, for example, a figure where the pore portions are traced by a tracing film and painted out is image-processed by an image analyzer (LUZEX IID, produced by NIRECO Corporation), and the area ratio (%) of pores is determined. The obtained value may also be used as the porosity.

$$\text{Porosity }(\%)=100\times(\rho 0-\rho)/\rho 0 \quad (1)$$

[wherein ρ0: density of the non-pore portions of resin film (A), ρ: density of resin film (A)].

In the case of a laminate body using the resin film (A) of the present invention, which is described later, the density (ρ) is determined based on the thickness and basis weight of the resin film layer of the present invention calculated by using the thickness and basis weight (g/m$^2$) of the laminate body and the thickness and basis weight of the portion after removing the resin film (A) of the present invention from the laminate body, the density (ρ0) of the non-pore portions is determined from the composition of constituent components, and then, the porosity can be determined according to the formula above.

The heat shrinkage percentage of the resin film (A) of the present invention after heating at 120° C. for 30 minutes is, in average of machine and cross two directions, 10% or less, preferably 8% or less, more preferably 5% or less. If the heat shrinkage percentage exceeds 10%, the film is greatly curled after passing through an electrophotographic printer or a copying machine to cause a curved or rolled state and it is difficult to continuously print a large number of sheets. The heat shrinkage percentage can be determined as follows. The resin film (A) is cut into a fixed size, for example, into a square with the height and width both of 100 mm, measured for its dimension in a constant-temperature constant-humidity room at a temperature of 23° C. and a relative humidity of 50%, heat-treated in a ventilated oven at 120° C. for 30 minutes, taken out, then allowed to cool in the same constant-temperature constant-humidity room for 1 hour, and again measured for its dimension, and the heat shrinkage percentage is calculated by comparison with the dimension before heat treatment in an oven.

<Composition>

The thermoplastic resin for use in the resin film (A) of the present invention is not particularly limited. The resin composition constituting the resin film (A) of the present invention contains from 30 to 99 wt % of a thermoplastic resin and from 70 to 1 wt % of an inorganic fine powder and/or an organic filler.

The thermoplastic resin may comprise only a crystalline resin, an amorphous resin or an elastomer or may comprise a mixture of two or more thereof. The thermoplastic resin is preferably a mixture of a crystalline resin and an amorphous resin, or a mixture of a crystalline resin and an elastomer.

Examples of the crystalline resin include thermoplastic resins such as ethylene-based resin (e.g., high-density polyethylene, low-density polyethylene, linear polyethylene), olefin-based resin (e.g., propylene-based resin) and polyester-based resin (e.g., polyethylene terephthalate, a copolymer thereof, polyethylene naphthalate, aliphatic polyester). Mixtures of two or more of these resins may also be used.

Among these, preferred in view of chemical resistance, low specific gravity, cost and the like are ethylene-based resins and olefin-based resins such as propylene-based resin, more preferred are high-density polyethylene and propylene-based resin, still more preferred is propylene-based resin. Examples of the propylene-based resin include propylene homopolymers obtained by homopolymerizing propylene, such as isotactic polymer, syndiotactic polymer and atactic polymer. Furthermore, polypropylene copolymers mainly comprising propylene having various stereo-regularities, obtained by copolymerizing propylene with an α-olefin such as ethylene, 1-butene, 1-hexene, 1-heptene and 4-methyl-1-pentene, may also be used. The copolymer may be a two-component system or a three or greater multi-component system and may be a random copolymer, a block copolymer or a graft copolymer.

From the standpoint of adjusting the melt tension of the resin composition, the melt tension of the propylene-based resin is preferably 10 g or more, more preferably 15 g or more, still more preferably 20 g or more.

Examples of the amorphous resin include thermoplastic resins such as terpene resin (e.g., hydrogenated terpene resin, aromatic modified terpene resin); vinyl carboxylate-based resin (e.g., vinyl acetate resin, vinyl stearate resin); (meth) acrylic acid ester-based resin (the (meth)acrylic acid ester includes an acrylic acid ester and a methacrylic acid ester) (e.g., acrylic acid resin, methacrylic acid resin, methyl (meth) acrylate resin, ethyl (meth)acrylate resin); polycarbonate; polystyrene-based resin (e.g., atactic polystyrene, syndiotactic polystyrene); and petroleum resin (e.g., hydrogenated petroleum resin, aliphatic petroleum resin, aromatic petroleum resin, cyclopentadiene-based petroleum resin). Mixtures of two or more of these resins may also be used.

Examples of the elastomer include isoprene rubber, butadiene rubber, 1,2-polybutadiene, styrene-butadiene rubber, chloroprene rubber, nitrile rubber, ethylene-propylene rubber, ethylene-propylene-ethylidene norbornene rubber, chlorosulfonated polyethylene, acryl rubber, epichlorohydrin rubber, silicone rubber, fluororubber, urethane rubber and thermoplastic elastomers having incompatible two components of soft segment and hard segment within the molecule.

Examples of the thermoplastic elastomer include a styrene-based thermoplastic elastomer, an olefin-based thermoplastic elastomer, a urethane-based thermoplastic elastomer, an ester-based thermoplastic elastomer, a vinyl chloride-based thermoplastic elastomer, a butyl rubber graft polyethylene, a trans-1,4-polyisoprene and an ionomer. Mixtures of two or more of these elastomers may also be used.

In the present invention, to effectively prevent curling, the blending ratio of an amorphous resin and/or an elastomer in the resin composition is preferably from 15 to 60 wt %, more preferably from 25 to 55 wt %, still more preferably from 35 to 55 wt %.

The resin film (A) or the present invention preferably has a porous structure having fine pores in the inside thereof by incorporating an inorganic fine powder and/or an organic filler.

The blending ratio of an inorganic fine powder and/or an organic filler in the resin composition is from 1 to 70 wt %, but in the case of the organic filler, most organic fillers have a small specific gravity and the blending ratio thereof is preferably from 1 to 50 wt %, more preferably from 3 to 40 wt %. In the case of the inorganic fine powder, the blending ratio is preferably from 1 to 65 wt %, more preferably from 3 to 65 wt %. To increase the pores, the amount of the inorganic fine powder is preferably larger but for the purpose of providing a good surface to the resin film (A), the amount of the inorganic fine powder is preferably 70 wt % or less. Also, if the amount of the inorganic fine powder is less than 1 wt %, forming the desired pores tends to be difficult. The inorganic fine powder and/or organic filler is not particularly limited.

Examples of the inorganic fine powder include a composite inorganic fine powder having an aluminum oxide or hydroxide in the periphery of the core of a hydroxyl group-containing inorganic fine powder such as heavy calcium carbonate, precipitated calcium carbonate, calcined clay, talc, titanium oxide, barium sulfate, aluminum sulfate, silica, zinc oxide, magnesium oxide, diatomaceous earth, silicon oxide and silica, and a hollow glass bead. In addition, surface-treated products of such an inorganic fine powder with various surface-treating agents may also be used. Preferred examples of the surface-treating agent include a resin acid, a fatty acid, an organic acid, a sulfuric acid ester-type anionic surfactant, a sulfonic acid-type anionic surfactant, a petroleum resin acid, a salt (e.g., sodium, potassium, ammonium) thereof, and a fatty acid, resin acid ester, wax or paraffin thereof. Other preferred examples include a nonionic surfactant, a diene-based polymer, a titanate-based coupling agent, a silane-based coupling agent and a phosphoric acid-based coupling agent.

Examples of the sulfuric acid ester-type anionic surfactant include a long-chain alcohol sulfuric ester, a polyoxyethylene alkyl ether sulfuric ester, a sulfated oil and a salt (e.g., sodium, potassium) thereof, and examples of the sulfonic acid-type anionic surfactant include an alkylbenzenesulfonic acid, an alkylnaphthalenesulfonic acid, an alkanesulfonic acid, a paraffinsulfonic acid, an α-olefinsulfonic acid, an alkylsulfosuccinic acid, and a salt (e.g., sodium, potassium) thereof.

Examples of the fatty acid include a caproic acid, a caprylic acid, a pelargonic acid, a capric acid, an undecanoic acid, a lauric acid, a myristic acid, a palmitic acid, a stearic acid, a behenic acid, an oleic acid, a linoleic acid, a linolenic acid and an eleostearic acid, examples of the organic acid include a carboxylic acid and a sulfonic acid; and examples of the nonionic surfactant include a polyethylene glycol ester-type surfactant. One of these surface-treating agents may be used alone, or two or more thereof may be used in combination.

In particular, heavy calcium carbonate, clay, diatomaceous earth and barium sulfate are preferred because these are inexpensive and in the case of shaping the film by stretching, good pore-forming property is obtained.

The organic filler is selected, for the purpose of forming pores, from incompatible resins having a melting point or glass transition point higher than that of the thermoplastic resin. Specific examples thereof include a polyethylene terephthalate, a polybutylene terephthalate, a polyamide, a polycarbonate, a polyethylene naphthalate, a polystyrene, a polymer or copolymer of acrylic acid ester or methacrylic acid ester, a melamine resin, a polyphenylene sulfite, a polyimide, a polyether ether ketone, a polyphenylene sulfide, a homopolymer of cyclic olefin, and a copolymer (COC) of cyclic olefin with ethylene or the like. In particular, when an olefin-based resin is used as the thermoplastic resin of the resin film (A), the organic filler is preferably selected from a polyethylene terephthalate, a polybutylene terephthalate, a polyamides a polycarbonate, a polyethylene naphthalate, a polystyrene, a homopolymer of cyclic olefin, and a copolymer (COC) of cyclic olefin with ethylene or the like.

When choosing between an inorganic fine powder and an organic filler, an inorganic fine powder is preferred because heat is less generated at the disposal by combustion.

The average particle diameter of the inorganic fine powder for use in the present invention or the average dispersed particle diameter of the organic filler is preferably from 0.01 to 30 μm, more preferably from 0.1 to 20 μm, still more preferably from 0.5 to 15 μm. In view of easy mixing with the thermoplastic resin, the particle diameter is preferably 0.01 μm or more. Also, when generating pores inside the film by stretching the film to enhance printability, the particle diameter is preferably 30 μm or less to reduce problems such as sheet rupturing when stretched or reducing the surface layer strength.

The average particle diameter of the inorganic fine powder for use in the present invention can be determined, for example, from a particle diameter (50% cumulative particle diameter) corresponding to 50% of the cumulative particle diameter as measured by a particle size analyzer such as laser diffraction-type particle size analyzer "Microtrac" (trade name, manufactured by Nikkiso Co., Ltd.). Also, the particle diameter of the organic filler dispersed in the thermoplastic resin by melt-kneading and dispersion can be determined as an average value by observing the cross-section of the resin film (A) through an electron microscope and measuring at least 10 particles.

The inorganic fine powder and/or organic filler in the resin composition of the resin film (A), may be selected from those described above and can be used alone or two or more in combination. For example, a combination of an inorganic fine powder and an organic filler may be used.

At the time of blending and kneading such an inorganic fine powder and/or an organic filler in the thermoplastic resin, an antioxidant, an ultraviolet stabilizer, a dispersant, a lubricant, a compatibilizer, a flame retardant, a color pigment, an electrostatic capacity modifier and the like may be added, if desired. In the case of using the resin film (A) of the present invention as a durable material, it is preferred to add an antioxidant, an ultraviolet stabilizer or the like. The antioxidant, when added, is usually added in an amount of 0.001 to 1 wt %. Specific examples of the antioxidant which can be used include sterically hindered phenol-based, phosphorus-based and amine-based stabilizers. The ultraviolet stabilizer, when used, is usually used in an amount of 0.001 to 1 wt %. Specific examples of the ultraviolet stabilizer which can be used include sterically hindered amine-based, benzotriazole-based and benzophenone-based stabilizers. The dispersant or lubricant is used for dispersing, for example, the inorganic fine powder.

The amount of dispersant or lubricant used is usually from 0.01 to 4 wt %. Specific examples of the dispersant or lubricant which can be used include a silane coupling agent, a higher fatty acid such as oleic acid and stearic acid, a metal soap, a polyacrylic acid, a polymethacrylic acid, and a salt thereof. Furthermore, when using an organic filler, the type and amount of a compatibilizer added are important because these determine the particle shape of the organic filler. Preferred examples of the compatibilizer for the organic filler include an epoxy-modified polyolefin and a maleic acid-modified polyolefin. The amount of the compatibilizer added is preferably from 0.05 to 10 parts by weight per 100 parts by weight of the organic filler.

The method for mixing the resin composition constituting the resin film (A) of the present invention is not particularly limited and various known methods can be applied, but the temperature and time of mixing are appropriately selected according to the properties of the components used. For example, the resin composition may be mixed where the components are dissolved or dispersed in a solvent, or by a melt-kneading method, but the melt kneading method is higher in the production efficiency. Examples thereof include a method where the thermoplastic resin is in the form of powder or pellet, the inorganic fine powder and/or organic filler, the dispersant and the like are mixed by a mixer such as a Henschel mixer, a ribbon blender or a supermixer, melt-kneaded in a twin-screw kneading extruder, extruded as a strand and cut to form pellets, and a method of extruding the mixture into water from a strand die and cutting the strand with a rotary cutter fixed to the die tip. Other examples include a method where the dispersant, which is in the form of a powder or a liquid; or dissolved in water or an organic solvent, is once mixed with the inorganic fine powder and/or organic filler and further mixed with other components such as thermoplastic resin.

The resin film (A) of the present invention is not particularly limited in its thickness and may be prepared to have a thickness of, for example, from 10 to 500 μm, preferably from 30 to 300 μm.

The resin film (A) of the present invention may have a single-layer structure, a two-layer structure or may have three or more layers, and the resin film (A) may be stretched at least along one axis direction. In this case, the number of stretching axes of the multilayer structure may be one axis/one axis, one axis/two axes, two axes/one axis, one axis/one axis/two axes, one axis/two axes/one axis, two axes/one axis/one axis, one axis/two axes/two axes, two axes/two axes/one axis or two axes/two axes/two axes. By having a multilayer structure, various functions such as writability, printability, suitability for thermal transfer, abrasion resistance and suitability for secondary processing can be imparted. Also, by stretching the film, desired pores of the resin film (A) may be obtained or rigidity may be imparted to enhance the ability of the film to pass through an electrophotographic printer or a copying machine.

The electrophotographic film may also be a laminate body obtained by laminating the resin film (A) on another thermoplastic resin film, laminate paper, pulp paper, non-woven fabric, cloth, wood sheet, metal sheet or the like. The thermoplastic resin film to be laminated may be, for example, a transparent or opaque film such as polyester film, polyamide film, polystyrene film and polyolefin film. This thermoplastic resin film may be stretched and may contain the above-described inorganic fine powder and/or organic filler. This film may be laminated by a known method such as coextrusion at the production of the resin film (A), melt lamination or lamination with an adhesive. The thickness of the laminate body is not particularly limited and is appropriately selected according to use. For example, the thickness is from 15 to 2,000 μm, preferably from 35 to 1,000 μm, more preferably from 50 to 500 μm.

<Production Method>

The resin film (A) of the present invention can be produced by combining various methods known to one skilled in the art. Regardless of which method is employed, the electrophotographic film produced is included in the scope of the present invention as long as it is an electrophotographic film satisfying the conditions of the present invention. Examples of the production method include a cast molding method of extruding the melted resin into a sheet form by using a single-layer or multilayer T-die connected to a screw-type extruder a stretched film method utilizing generation of pores by stretching, a rolling method of generating pores at the rolling, a calender molding method, an expansion method using a foaming agent, a method using a pore-containing particle, an inflation molding method, a solvent extraction method, and a method of dissolving and extracting mixed components. Among these, preferred is a stretched film method because the adjustment of porosity is facilitated.

In stretching the film, various known methods can be used. As for the stretching temperature, the stretching may be performed within the temperature range suitable for the thermoplastic resin, that is, at a temperature higher than the glass transition temperature of the thermoplastic resin used in the case of an amorphous resin, and at a temperature from the glass transition temperature of the amorphous moiety to the melting point of the crystal moiety in the case of a crystalline resin. Specifically, the film can be stretched, for example, by longitudinal stretching utilizing the difference in peripheral speed among a group of rolls, transverse stretching using a tenter oven, rolling, inflation stretching using a mandrel for a tubular film, or simultaneous biaxial stretching using a combination of a tenter oven and a linear motor.

The draw ratio is not particularly limited and is appropriately determined by taking into account the intended use of the electrophotographic film of the present invention, the characteristics of the thermoplastic resin used, and the like. For example, when a propylene homopolymer or copolymer is used as the thermoplastic resin, the draw ratio is, in the case of stretching in one direction, from about 1.2 to 12 times, preferably from 2 to 10 times, and in the case of biaxial stretching, from 1.5 to 60 times, preferably from 10 to 50 times, in terms of the area ratio. When another thermoplastic resin is used, the draw ratio is, in the case of stretching in one direction, from 1.2 to 10 times, preferably from 2 to 7 times, and in the case of biaxial stretching, from 1.5 to 20 times, preferably from 4 to 12 times, in terms of the area ratio.

Furthermore, heat treatment at a high temperature may be applied, if desired. The stretching temperature is a temperature 2 to 160° C. lower than the melting point of the thermoplastic resin used. When a propylene homopolymer or copolymer is used as the thermoplastic resin, the stretching temperature is preferably 2 to 60° C. lower than the melting point thereof, and the stretching rate is preferably from 20 to 350 m/min.

The film obtained in this way has a large number of fine pores inside the film at a porosity of 75% or more, preferably 70% or less, as calculated by formula (1). By virtue of the presence of pores, the film can be flexible as compared with a stretched film where pores are not present.

To enhance the adhesive property and coatability between the resin film (A) and the toner-receiving layer (B) described later, at least one surface of the resin film (A) is preferably surface-treated. In the case of using a laminate body, the surface treatment may be applied to, for example, the thermoplastic resin film layer.

The surface treating method includes a surface oxidations treatment and a treatment using a surface treating agent. The surface treatment is preferably performed by combining a surface oxidation treatment and using a surface treating agent.

Specific examples of the surface oxidation treatment include corona discharge treatment, flame treatment, plasma treatment, glow discharge treatment and ozone treatment. Among these, preferred are corona treatment and flame treatment, and more preferred is corona treatment.

The treating amount is, in the case of corona treatment, from 600 to 12,000 $J/m^2$ (from 10 to 200 $W\cdot min/m^2$), preferably from 1,200 to 9,000 $J/m^2$ (from 20 to 150 $W\cdot min/m^2$). The treating amount must be 600 $J/m^2$ (10 $W\cdot min/m^2$) or more for obtaining a sufficiently high effect of the corona discharge treatment, whereas even if the treating amount exceeds 12,000 $J/m^2$ (200 $W\cdot min/m^2$), the effect of the treatment is not increased any more and therefore, a treating amount of 12,000 $J/m^2$ (200 $W\cdot min/m^2$) or less is enough. In the case of flame treatment, the treating amount is from 8,000 to 200,000 $J/m^2$, preferably from 20,000 to 100,000 $J/m^2$. The treating amount must be 8,000 $J/m^2$ or more for obtaining the effect of the flame treatment, whereas even if the treating amount exceeds 200,000 $J/m^2$, the effect of the treatment is saturated and therefore, a treatment amount of 200,000 $J/m^2$ or less is enough.

As for the surface treating agent, one type of agent or a mixture of two or more agents from the following materials can be used. Particularly, when a surface treating agent is prepared by combining a primer as the main component is used, the adhesion to the toner-receiving layer (B) can be elevated and this is preferred. Specific examples of the surface treating agent include a water-soluble primer selected from the group consisting of polyethyleneimine, butylated ethyleneimine, hydroxypropylated polyethyleneimine, hydroxyethylated polyethyleneimine, 2,3-dihydroxypropylated polyethyleneimine, poly(ethyleneimine-urea), an ethyleneimine adduct of polyaminepolyamide or the like, an epichlorohydrin adduct of polyaminepolyamide or the like, acrylic emulsion, and tertiary or quaternary nitrogen-containing acrylic resin.

The method for forming a surface treatment layer by using such a surface treating agent is not particularly limited but, for example, the surface treatment layer may be formed by coating the surface treating agent with use of a roll coater, a blade coater, a bar coater, an air knife coater, a size press coater, a gravure coater, a reverse coater, a die coater, a lip coater, a spray coater or the like, smoothing the coating, if desired, and removing excess water or hydrophilic solvent through a drying step.

In the case where the resin film (A) is a stretched film, the surface treating agent may be coated before or after the longitudinal or transverse stretching, and the coating may be either one-step coating or multi-step coating.

(2) Toner-Receiving Layer (B)

To enhance the reproducibility of image or letter, a toner-receiving layer comprising an inorganic and/or organic pigment and a binder may be provided on the printing surface side of the resin film (A) or laminate body of the present invention. The toner-receiving layer may be, for example, a resin such as acrylic acid-based resin, a polyester-based resin, a urethane-based resin, a vinyl acetate-based copolymer and a maleic acid-based copolymer, and an inorganic fine powder such as silica, talc, titanium oxide, heavy calcium carbonate and precipitated calcium carbonate. If desired, various materials may be further added. The material added can be appropriately selected from the materials commonly used for the toner-receiving layer (B). Examples of the material which can be used include a hardening agent, an ultraviolet absorbent and a surfactant. Such a material must be used in an amount of not excessively inhibiting the water resistance or weather resistance of the toner-receiving layer (B).

The method for forming the toner-receiving layer (B) is not particularly limited but examples thereof include a dry lamination method, an extrusion lamination method, a wet lamination method and a coating method. Among these, a coating method is preferred. Examples of the coating method include a method of dispersing and diluting respective components constituting the toner-receiving layer (B) in a solvent where non-aqueous solvents such as toluene, ethyl acetate, methyl ethyl ketone and isopropyl alcohol are used individually or in combination, and coating the obtained coating material. It is also possible to disperse and dilute the constituent components in a dilute solvent primarily containing water within the range where the toner-receiving layer (B) can maintain the water resistance, and depending on the case, using methanol, ethanol or the like in combination. The coating material obtained can be coated onto the layer. The solid content concentration of the prepared coating material solution is usually from 10 to 60 wt %, preferably from 15 to 50 wt %. If the solid content concentration is less than 10 wt %, the evaporation of the dilute solvent requires energy and this is liable to be uneconomical, whereas if the solid concentration exceeds 60 wt %, the ability to use as a coating is inferior.

The method of using the coating material for the toner-receiving layer (B) is not particularly limited and may be coated, for example, with a roll coater, a blade coater, a bar coater, an air knife coater, a gravure coater, a reverse coater, a die coater, a lip coater, a spray coater, a size press coater or the like. After this coating, the coated layer is smoothed, if desired, and dried to remove excess solvent, whereby the toner-receiving layer can be formed. The coated amount is from 0.005 to 35 g/m$^2$, preferably from 0.01 to 20 g/m$^2$, in terms of the solid content after drying. If the coated amount is less than 0.005 g/m$^2$, the effect of the toner-receiving layer is insufficient, whereas if it exceeds 35 g/m$^2$, high cost and poor profitability may result.

(3) Adhesive Layer (C)

The kind and thickness (coated amount) of the adhesive layer (C) provided on one surface of the resin film (A) or laminate body can be variously selected according to the kind of adherent, the environment in use, the adhesive strength or the like.

As for the aqueous or solvent-type pressure-sensitive adhesive commonly used, representative examples are a rubber-based pressure-sensitive adhesive, an acryl-based pressure-sensitive adhesive and a silicone-based pressure-sensitive adhesive. Specific examples of the rubber-based pressure-sensitive adhesive include a polyisobutylene rubber, a butyl rubber, a mixture of polyisobutylene rubber and butyl rubber, and those obtained by blending a tackifier such as rosin abietate, terpene-phenol copolymer and terpene-indene copolymer to the rubber-based pressure-sensitive adhesive. Specific examples of the acryl-based pressure-sensitive adhesive include a 2-ethylhexyl acrylate.n-butyl acrylate copolymer and a 2-ethylhexyl acrylate.ethyl acrylate-methyl acrylate copolymer each having a glass transition point of −20° C. or less. Such a synthetic polymer pressure-sensitive adhesive can be used in the form of being dispersed in an organic solvent solution or dispersed in water, such as dispersion or emulsion.

For the purpose of enhancing opacity of the label, a pressure-sensitive adhesive having incorporated therein a pigment such as titanium white may also be used.

The adhesive layer (C) can be formed by coating a solution of the pressure-sensitive adhesive on a surface where the resin film (A) or laminate body and the release paper (D) described later are laminated. The pressure-sensitive adhesive solution is coated by a roll coater, a blade coater, a bar coater, an air knife coater, a gravure coater, a reverse coater, a die coater, a lip coater, a spray coater, a comma coater or the like, smoothed, if desired, and dried, whereby the adhesive layer (C) is formed. In a general method, the pressure-sensitive adhesive is coated on the release paper (D) described later and, if desired, dried to form the pressure-sensitive layer (C), and the resin film (A) or laminate body is stacked thereon. But, depending on the case, the adhesive layer (C) may be formed by coating the pressure-sensitive adhesive directly on the resin film (A) or laminate body.

The coated amount of the pressure-sensitive adhesive is not particularly limited but is usually from 3 to 60 g/m$^2$, preferably from 10 to 40 g/m$^2$, in terms of the solid content amount.

(4) Release Paper (D)

The release paper (D) interposed between the resin film (A) or laminate body and the adhesive layer (C) can be subjected to silicon treatment of the surface which comes into contact with the adhesive layer (C) so as to enhance the releasability from the adhesive layer (C) when the electrophotographic film is used as a label.

As for the release paper (D), any paper can be usually used. A wood-free paper or craft paper as it is or after calendering, resin coating or film lamination, or a glassine paper, coated paper or plastic film, which is subjected to silicon treatment, can be used.

[Electrostatic Capacity]

The electrostatic capacity of the electrophotographic film of the present invention is preferably 5 pF/cm$^2$ or more, more preferably from 6 to 1,000 pF/cm$^2$, still more preferably from 10 to 800 pF/cm$^2$, per unit electrode area. If the electrostatic capacity is less than 5 pF/cm$^2$, the toner transfer ratio is low regardless of the mode used by the printer and a sufficiently high density cannot be obtained. Conversely, if the electrostatic capacity exceeds 1,000 pF/cm$^2$, the electric charge applied for transferring the toner onto a paper sheet in the printer remains on the electrophotographic film at the discharge of paper from the printer. When this occurs the electrophotographic films attract each other on the paper discharge tray. As a result of this attraction, blocking is liable to readily occur. Furthermore, to obtain an electrostatic capacity exceeding 1,000 pF/cm$^2$, a large amount of an electrostatic capacity modifier must be added to the electrophotographic film and increases production cost.

The electrostatic capacity of the electrophotographic film of the present invention is measured by using "4192 ALF IMPEDANCE ANALYZER" (trade name, manufactured by Hewlett Packard). A specimen larger than the electrode diameter is interposed between an applying electrode with a diameter of 38 mm and a guard electrode in an atmosphere at a temperature of 23° C. and a relative humidity of 50%, and the electrostatic capacity is measured at a frequency in the range from 10 Hz to 1 Mz by applying a voltage of 5 V. The measured value at a frequency of 300 Hz is used as the representative value.

[Curl after Printing by Thermal Fixing-Type Electrophotographic Printer or Thermal Fixing-Type A Copying Machine]

When the electrophotographic film of the present invention is cut into an A-4 size (210 mm×297 mm) and this sample is printed by a thermal fixing-type electrophotographic printer or a copying machine, the average curl height at four corners after the passage of 2 minutes or more from printing is preferably 50 mm or less. Incidentally, the thermal fixing method in general is a fixing method using a heated roll or a heated belt.

More specifically, the electrophotographic film is cut into an A-4 size (210 mm×297 mm), left standing for 1 day in a constant-temperature constant-humidity chamber at a temperature of 23° C. and a relative humidity of 50% and then printed by a commercially available heated roll fixing-type electrophotographic printer (LASER SHOT LBP-950, trade name, manufactured by Canon Inc.). The model picture selected for the printing test is a pattern where heavy color and monochrome are mixed. The electrophotographic film is passed through the printer, left standing on a flat table at a temperature of 23° C. and a relative humidity of 50%, and then placed such that the curl after 2 minutes from the passing through the printer is lifted upward. The curl height when the curl is lifted to the printed surface side is taken as a plus value, and the curl height when the curl is lifted to the surface opposite the printed surface is taken as a minus value. From the obtained values, the average value of curl heights at four corners is determined. This average value is preferably 50 mm or less. If the average value exceeds 50 mm, it is difficult to print a large number of sheets.

[Staining of the Toner-Fixing Unit]

When the electrophotographic film of the present invention is cut into an A-4 size (210 mm×297 mm) and printed by a thermal fixing-type electrophotographic printer or a copying machine and when jamming occurs in the toner-fixing unit part, the heated roll or heated belt of the toner-fixing unit part after taking out the electrophotographic film is preferably not melt-bonded with a part of the film.

More specifically, the electrophotographic film is cut into an A-4 size (210 mm×297 mm), left standing for 1 day in a constant-temperature constant-humidity chamber at a temperature of 23° C. and a relative humidity of 50% and then printed by a commercially available heated roll fixing-type electrophotographic printer (LASER SHOT LBP-950, trade name, manufactured by Canon Inc.). The power source is turned off while the electrophotographic film is passed through the toner-fixing unit resulting in a paper jam and after 10 seconds, the electrophotographic film is taken out. At this time, the toner-fixing unit, particularly, the toner-fixing roll surface, is preferably not melt-bonded with a part of the film, and the toner-fixing roll surface is preferably clean. If the printing is restarted in the state of the fixing roll being stained, the printer may break down or the intended text or image can be hardly obtained. Therefore, the staining must be removed and time is spent for the cleaning. The model picture selected for the printing test is a pattern where heavy color and monochrome are mixed.

[Printing]

As described above, the electrophotographic film of the present invention can provide a recorded material through printing or letter-printing with a thermal fixing-type electrophotographic printer or a copying machine.

The electrophotographic film of the present invention can also be used to print a trade name, a manufacturer name, an expiration date, a picture of a character, a fill-in column, a bar code or the like by relief printing, gravure printing, flexographic printing, solvent-type offset printing, ultraviolet curing-type offset printing or the like.

Furthermore, if desired, a coat layer such as an inkjet-receiving layer may be provided on the front or back surface of the electrophotographic film of the present invention, so that a recorded material can be prepared by printing or letter-printing with an inkjet printer or the like.

Such printing or letter-printing may be performed ion an electrophotographic film alone or on a label with pressure-sensitive adhesive/release paper or adhesive/release paper.

EXAMPLES

The present invention is described in greater detail below by referring to Examples, Comparative Examples and Test Examples. The material, amount used, ratio, operation and the like employed in Examples and the like below can be appropriately changed as long as it does not depart from the purpose of the present invention. Accordingly, the scope of the present invention is not limited to the following specific examples.

Electrophotographic films of the present invention and electrophotographic films for comparison were produced according to the following procedure. The thermoplastic resin, inorganic fine powder and organic filler used are shown together in Table 1.

TABLE 1

| Blended Component | Kind | Contents | Heat of Transition (J/g) | Density ($g/cm^3$) | Melt tension (g) |
|---|---|---|---|---|---|
| Thermoplastic resin | high melt tension polypropylene (HMS-PP) | (SD-632, trade name, SunAllomer Ltd.) (MFR (230° C., load: 2.16 kg) = 3 g/10 min) | 76 | 0.9 | 23 |
| | olefin-based elastomer (TPO) | (Zelas 5053, trade name, Mitsubishi Chemical Corp.) (MFR (230° C., load: 2.16 kg) = 5 g/10 min) | 45 | 0.9 | 1.0 |
| | propylene homopolymer (1) (h-PP (1)) | (Novatec PP:FY4, trade name, Japan Polychem Corp.) (MPR (230° C., load: 2.16 kg) = 5 g/10 min) | 94 | 0.9 | 1.8 |
| | propylene homopolymer (2) (h-PP (2)) | (Novatec PP: EA8, trade name, Japan Polychem Corp.) (MFR (230° C., load: 2.16 kg) = 0.8 g/10 min) | 94 | 0.9 | 7.0 |
| Inorganic fine powder | calcium carbonate | heavy calcium carbonate with average particle diameter of 2.2 μm and specific surface area of 10,000 $cm^2/g$ (Softon 1000, trade name, Bihoku Funka Kogyo Co., Ltd.) | 0 | 2.7 | — |
| Organic filler | polybutylene terephthalate resin (PBT) | (NOVADUR 5010, trade name, Mitsubishi Chemical Corp.) | 42 | 1.3 | — |

Example 1

Resin Film (A)

The composition [(1)] having blended therein 40 wt % of calcium carbonate (shown in Table 1) was kneaded with a mixture containing 20 wt % of HMS-PP (shown in Tale 1) and 40 wt % of TPO (shown in Table 1) by an extruder set at 250° C., extruded into a stand and cut into pellets. This composition [(1)] was extruded into a film from a T-die connected to the extruder set at 250° C., and cooled with a cooling device to obtain an unstretched film.

The resulting unstretched film was heated at 145° C. (temperature a) and then stretched in the longitudinal direction at a draw ratio of 5 times to obtain a single-layer stretched film (thickness: 150 μm, crystallization heat: 41 J/$cm^3$, melt tension: 8 g).

Both surfaces of the obtained film were subjected to corona discharge treatment at an applied energy density of 90 W·min/$m^2$.

Incidentally, at the time of melt-kneading the resin component or a mixture of the resin component and the fine powder in Examples and Comparative Examples, 0.2 parts by weight of BHT (4-methyl-2,6-di-tert-butylphenol) and 0.1 part by weight of Irganox 1010 (phenol-based antioxidant, trade name, produced by Ciba Geigy) were further added as antioxidants per 100 parts by weight in total of the resin component and the fine powder.

The particle diameter of the calcium carbonate powder used in Examples is a 50% cumulative particle diameter as measured by a laser diffraction-type particle size analyzer "Microtrac" (trade name, manufactured by Nikkiso Co., Ltd.).

The obtained resin films were evaluated in the following manner. The evaluation results are shown in Table 2.

<Evaluation>

1. Evaluation of Curl Height

The obtained electrophotographic film of the present invention was cut into an A-4 size (210 mm×297 mm) and left standing for 1 day in a constant-temperature constant-humidity chamber at a temperature of 23° C. and a relative humidity of 50%. Subsequently, printing was performed with a commercially available heated roll fixing-type electrophotographic printer (LASER SHOT LBP-950, trade name, manufactured by Canon Inc.) on which the resin film is passed (A) through a route of turning up the printed surface at the discharge of paper.

After passing through the printer, the electrophotographic film was left standing on a flat table in an atmosphere at a temperature of 23° C. and a relative humidity of 50%, and then the curl heights at four corners of the film were evaluated.

ii. Evaluation of Staining of a Toner-Fixing Unit after Jamming

The electrophotographic film was cut into an A-4 size (210 mm×297 m) and left standing for 1 day in a constant-temperature constant-humidity chamber at a temperature of 23° C. and a relative humidity of 50%. Subsequently, the resin film (A) was passed through a commercially available heated roll fixing-type electrophotographic printer (LASER SHOT LBP-950, trade name, manufactured by Canon Inc.). The power source was turned off while the electrophotographic film passed through the toner-fixing unit to cause a jam. After 10 seconds, the electrophotographic film was taken out. At this time, the toner-fixing unit, particularly, the toner-fixing roll surface, was visually observed and evaluated according to the following criteria.

Good (○): A part of the film was not melt-bonded to the fixing roll surface (practically usable)

Bad (x): A part of the film was melt-bonded to the fixing roll surface (difficult for practical use)

iii. Evaluation of Printing Quality

The image and letter after printing were visually observed for thickening, deformation, poor printing density and background staining and evaluated according to the following criteria.

Very good (◎): Clear image and letter (practically usable).

Good (○): Thickening, deformation, poor printing density and background staining were less generated (practically usable).

Bad (x): Thickening, deformation, poor printing density and background staining were conspicuously generated (difficult for practical use).

Example 2

An unstretched film was obtained by the same operation as in Example 1 from the composition [(2)] having the blended components and blended amounts shown in Table 2, and this unstretched film was heated at 140° C. (temperature a) and then stretched in the longitudinal direction at a draw ratio of 5 times to obtain a stretched film.

The composition [(2)] was extruded into a film from a T-die connected to two extruders each set at 240° C. The obtained film was laminated on both surfaces of the 5-fold stretched film prepared above. After cooling to 55° C., the resulting film was heated at 162° C. (temperature b) and stretched in the transverse direction at a draw ratio of 8 times. This stretched film was annealed at 165° C. (temperature c), then cooled to 50° C. and trimmed to obtain a film having a three-layer structure (thickness: 25/100/25 μm, crystallization heat: 45 J/$cm^3$, melt tension: 10 g). Thereafter, a surface oxidation treatment was performed by the same operation as in Example 1 and the produced electrophotographic film was evaluated. The evaluation results are shown in Table 2.

Example 3

An electrophotographic film was produced by the same operation as in Example 2 except that the kinds and amounts of blended components of the composition [(3)] and the molding conditions shown in Table 2 were used, and evaluated. The evaluation results are shown in Table 2.

Example 4

The composition [(4)] having the kinds and amounts of blended components shown in Table 2 was prepared and by using a multilayer die connected to three different extruders each set at 250° C., the compositions [(3)] and [(4)] were extruded into a film such that the compositions were stacked in the die to give a three-layer structure, that is, the composition [(4)] was stacked on both sides of the composition [(3)] extruded as the center layer, and the resulting film was cooled by a cooling device to obtain an unstretched film.

This unstretched film was then heated at 142° C. (temperature a), stretched in the longitudinal direction at a draw ratio of 5 times and then cooled to obtain a stretched film.

The obtained film was again heated at 160° C. (temperature b) and stretched in the transverse direction by a tenter at a draw ratio of 8 times. This stretched film was annealed at 165° C. (temperature c), then cooled to 50° C. and trimmed to obtain a film having a three-layer structure (thickness: 25/100/25 μm, crystallization heat: 53 J/$cm^3$, melt tension: 11 g). Thereafter, a surface oxidation treatment was performed by the same operation as in Example 1 and the produced electrophotographic film was evaluated. The evaluation results are shown in Table 2.

Example 5

The electrophotographic film of Example 2 was used as a support (one surface specification) and the coating solution for toner-receiving layer shown below was coated thereon to have a solid content amount of 5 g/$m^2$ and then cured at 90° C. for 1 minute. The electrophotographic film produced was evaluated. The evaluation results are shown in Table 2.

<Coating Solution for Toner-Receiving Layer>

The coating solution for toner-receiving layer was prepared as follows. Into a three-neck flask equipped with a stirrer, a reflux condenser and a thermometer, 15 parts of 2-hydroxyethyl methacrylate, 50 parts of methyl methacrylate, 35 parts of ethyl acrylate and 100 parts of toluene were charged. After nitrogen purging, polymerization was performed at 80° C. for 4 hours by using 0.6 parts of 2,2'-azobisisobutyronitrile as the initiator. The obtained solution was a 50% toluene solution of a hydroxyl group-containing methacrylic acid ester polymer having a hydroxyl value of 65.

To this solution, a 75% ethyl acetate solution of hexamethylene diisocyanate (Coronate HL, produced by Nippon Polyurethane Co., Ltd.), a silica powder having an average secondary particle diameter of 3 μm (Sylisia 370, produced by Fuji Silysia Chemical Ltd.), and a heavy calcium carbonate powder having an average particle diameter of 1.5 μm (produced by Shiraishi Calcium Kaisha, Ltd.) were blended at a solid content ratio shown below.

<Solid Content Ratio>

| | |
|---|---|
| Methacrylic acid ester polymer | 48 wt % |
| Hexamethylene diisocyanate | 2 wt % |
| Silica | 25 wt % |
| Heavy calcium carbonate | 25 wt % |

The solid content of this mixture was adjusted to 35 wt % by adding butyl acetate.

Comparative Examples 1 to 3

Electrophotographic films were produced by the same operation as in Example 2 except that the kinds and amounts of blended components of each of the compositions [(5)], [(6)] and [(7)] and the molding conditions shown in Tale 2 were used, and evaluated. The evaluation results are shown in Table 2.

TABLE 2

| | | | Example | | | | | Comparative Example | | |
|---|---|---|---|---|---|---|---|---|---|---|
| | | Unit | Example 1 | Example 2 | Example 3 | Example 4 | Example 5 | Comparative Example 1 | Comparative Example 2 | Comparative Example 3 |
| Blending Component | Composition | | Composition (1) | Composition (2) | Composition (3) | Composition (3), (4) | Composition (2) | Composition (5) | Composition (6) | Composition (7) |
| | Thermoplastic Resin Kind 1 | — | HMS-PP | HMS-PP | HMS-PP | HMS-PP | HMS-PP | h-PP (1) | h-PP (2) | HMS-PP |
| | Blended amount | wt % | 20 | 28 | 35 | 45 | 28 | 65 | 60 | 5 |
| | Kind 2 | — | TPO | TPO | TPO | TPO | TPO | TPO | TPO | TPO |
| | Blended amount | wt % | 40 | 42 | 45 | 50 | 42 | 5 | 10 | 65 |
| | Inorganic fine powder/organic filler | | | | | | | | | |
| | Kind | — | calcium carbonate | calcium carbonate | calcium carbonate | calcium carbonate | PBT | calcium carbonate | calcium carbonate | calcium carbonate |
| | Average particle diameter or average dispersed particle diameter | μm | 1.8 | 1.8 | 1.8 | 2.0 | 1.8 | 1.8 | 1.8 | 1.8 |
| | Blended amount | wt % | 40 | 30 | 20 | 5 | 30 | 30 | 30 | 30 |
| Molding Conditions | Temperature a | ° C. | 145 | 140 | 140 | 142 | 140 | 140 | 143 | 140 |
| | Temperature b | ° C. | — | 162 | 162 | 160 | 162 | 165 | 165 | 160 |
| | Temperature c | ° C. | — | 165 | 165 | 165 | 165 | 167 | 167 | 165 |
| | Stretching step | — | uniaxial | biaxial | biaxial | biaxial | biaxial | biaxial | biaxial | biaxial |
| | Draw ratio | times | 1 × 5 | 5 × 8 | 5 × 8 | 5 × 8 | 5 × 8 | 5 × 8 | 5 × 8 | 5 × 8 |
| | Surface oxidation treatment | — | done | done | done | done | done | done | done | done |
| | Toner-receiving layer (B) | — | none | none | none | none | formed | none | none | none |
| Evaluation Results | Thickness of resin film (A) | μm | 150 | 150 | 150 | 150 | 150 | 150 | 150 | 150 |
| | Porosity of resin film | % | 30 | 25 | 23 | 8 | 25 | 25 | 30 | 15 |

TABLE 2-continued

| | | Example | | | | | Comparative Example | | |
|---|---|---|---|---|---|---|---|---|---|
| | Unit | Example 1 | Example 2 | Example 3 | Example 4 | Example 5 | Comparative Example 1 | Comparative Example 2 | Comparative Example 3 |
| (A) | | | | | | | | | |
| Crystallization heat of resin composition | J/cm$^3$ | 41 | 45 | 49 | 53 | 45 | 70 | 67 | 37 |
| Crystallization temperature at main peak of resin composition | ° C. | 125 | 125 | 125 | 125 | 125 | 110 | 110 | 125 |
| Melt tension of resin composition | g | 8 | 10 | 11 | 11 | 10 | 2 | 6 | 3 |
| Curl height of resin film (A) (2 min after printing | mm | 3 | 10 | 20 | 30 | 10 | rolled | rolled | 0 |
| Staining of fixing unit at jamming (film was taken out after 10 sec) | rating with eye | ○ | ○ | ○ | ○ | ○ | X | X | |
| Electrostatic capacity | pF/cm$^2$ | 11 | 11 | 11 | 12 | 15 | 11 | 11 | 11 |
| Printed image quality | rating with eye | ○ | ○ | ○ | ○ | ◎ | ○ | ○ | ○ |

While the invention has been described in detail and with reference to specific examples thereof, it will be apparent to one skilled in the art that various changes and modifications can be made therein without departing from the spirit and scope thereof.

This application is based on the Japanese patent application (Patent Application No. 2002-379194) filed Dec. 27, 2002, the contents of which are incorporated herein by reference.

INDUSTRIAL APPLICABILITY

The electrophotographic film of the present invention is reduced in the heat curling after printing by a thermal fixing-type electrophotographic printer or a copying machine, suitable for continuous printing of a large number of sheets and prevented from staining the toner-fixing unit even when jamming occurs, and thus realizes good printing property. The paper after recording is useful for indoor and outdoor uses because of its excellent water resistance and mechanical properties, and can also be used as a label if the paper is provided with an adhesive.

The invention claimed is:

1. A film comprising a resin film (A) which comprises a resin composition which comprises at least one inorganic fine powder, an organic filler, or a combination thereof, wherein said resin composition comprises a propylene resin having a melt tension of 10 g or more at 210° C., and wherein the resin composition has a melt tension of 5 g or more at 210° C., a crystallization temperature of 120° C. or more and a crystallization heat of 60 J/cm$^3$ or less.

2. The film as claimed in claim 1, which can be printed on with a thermal fixing-type electrophotographic printer or a thermal fixing-type electrophotographic copying machine.

3. The film as claimed in claim 1 or 2, wherein the average curl height at four corners of the film is 50 mm or less, which is measured after the passage of at least 2 minutes following printing of the film, wherein the film is in the form of an A-4 size (210 mm×297 mm) paper and is printed with a thermal fixing-type electrophotographic printer or a thermal fixing-type electrophotographic copying machine.

4. The film as claimed in claim 1, which has an electrostatic capacity is at least 5 pF/cm$^2$.

5. The film as claimed in claim 1, wherein said resin composition comprises from 30 to 99 wt % of a propylene resin and from 1 to 70 wt % of an inorganic fine powder, an organic filler, or a combination thereof.

6. The film as claimed in claim 1, which comprises two or more layers.

7. The film as claimed in claim 1, wherein said resin film (A) is stretched at least in one axial direction.

8. The film as claimed in claim 1, wherein said resin film (A) has a porosity of 1 to 75% as calculated according to the following formula:

$$\text{Porosity }(\%)=100\times(\rho0-\rho)/\rho0$$

wherein ρ0 is the density of a non-pore portion of resin film (A) and ρ is a density of resin film (A).

9. The film as claimed in claim 1, wherein said resin film (A) has an average heat shrinkage of 10% or less after heating at 120° C. for 30 minutes.

10. The film as claimed in claim 1, which further comprises a thermoplastic resin film different from said film (A).

11. The film as claimed in claim 1, wherein at least one surface of said resin film (A) is subjected to an oxidation treatment, comprises a toner-receiving layer (B), or a combination thereof.

12. The film as claimed in claim 1 further comprising an adhesive layer (C) and a release paper (D).

13. A recorded material comprising the film as claimed in claim 1 and on a surface of the film, printed text, a printed image, or a combination of printed text and a printed image.

14. A method for printing at least one of text and an image, the method comprising printing at least one of text and an image on the film as claimed in claim 1 in a thermal fixing-electrophotographic printer or a thermal fixing electrophotographic copying machine.

15. The film as claimed in claim 1, wherein the propylene resin has a melt tension of 15 g or more at 210° C.

16. The film as claimed in claim 1, wherein the propylene resin has a melt tension of 20 g or more at 210° C.

17. The film as claimed in claim 1, which has a thickness of from 10 to 500 μm.

* * * * *